Patented Jan. 15, 1946

2,392,854

UNITED STATES PATENT OFFICE 2,392,854

PECTOUS MATERIAL AND METHOD OF PREPARING SAME

Herbert T. Leo and Clarence C. Taylor, Anaheim, Calif., assignors to Mutual Citrus Products Co., Inc., Anaheim, Calif., a corporation of California No Drawing. Application February 20, 1943, Serial No. 476,650

6 Claims. (Cl. 252—363.5)

This invention relates to a novel pectous material and to methods of preparing the same. More particularly, the invention pertains to a pectous material that while dispersible in plain water to form dispersions more viscous than conventional pectin dispersions is also dispersible in solutions of organic acids and salts thereof to form dispersions that have a viscosity comparable to those of conventional pectin dispersions. The invention further relates to the above mentioned dispersions of the novel pectous material.

A conventional method of isolating pectin from vegetable material, in particular, fruit material, includes an initial extraction of the pectin by means of an acid aqueous medium followed by a precipitation of the pectin from the resulting extract by one of several methods. One such method involves precipitation of aluminum hydroxide in the pectous extract. The precipitated aluminum hydroxide takes large amounts of pectin out of solution. Heretofore, pectin precipitation by means of aluminum hydroxide has been accomplished by using ammonia and aluminum chloride or aluminum sulfate. The filtered pectous extract is first made alkaline with ammonia and then a solution of aluminum chloride or aluminum sulfate is added to the alkaline pectin extract. The aluminum hydroxide then precipitated carries down pectin in the form of a curd. This curd is gathered in centrifugal baskets and a large portion of the water contained therein is thrown out. The dehydrated curd is then treated with aqueous alcohol containing hydrochloric acid to wash out the aluminum hydroxide, which is soluble in the acidified aqueous alcohol. After repeated washings with the acidified aqueous alcohol, the pectin, from which the aluminum hydroxide has been dissolved out, is dried and ground.

In the above described conventional process the precipitate of pectin and aluminum hydroxide having the form of curds is washed with acidified alcohol to a point where the washed alcohol is dispersible in water in the same manner as pectin prepared by other conventional methods, such as precipitation from an acid aqueous extract by means of alcohol. We have now found that if this washing with acidified alcohol is not carried so far as to yield a pectin containing about 1.5% $Al_2O_3$, a pectin is obtained that is characterized by solubility and dispersion characteristics different from those of conventional pectin. More particularly, the novel pectous material of the present invention, while dispersible in water to form dispersions having viscosities of from 60 to 170 seconds as compared to a viscosity of 46 seconds for conventional pectin when measured by the same method, will form dispersions in aqueous solutions of organic acids and salts thereof, in particular sodium or other alkali metal salts, that are characterized by viscosities falling between the viscosities of the same pectin when dispersed in plain water and the viscosities of pure pectin dispersions in plain water.

We have further found that washing of the above mentioned curd-like coprecipitate of aluminum hydroxide and pectin can be effected with solutions of organic acids or salts thereof in place of all or some of the washings with acidified alcohol described hereinabove. Thus a combined treatment with, first, alcohol and hydrochloric acid and then, for instance, aqueous sodium citrate solutions may be substituted for the conventional treatment with acidified alcohol.

The methods of the present invention are also applicable to the method of isolating pectin by coprecipitation with aluminum hydroxide disclosed in our copending application filed of even date herewith entitled "Method of preparing pectin," Serial No. 476,626. The nature of the reactions effected and the products obtained in the coprecipitation of pectin with aluminum hydroxide according to the methods of our copending application are illustrated by a series of experiments which we have carried out with one gallon lots of a pure pectin solution made up by dissolving 5 ounces of 200-grade pectin in 4 gallons of distilled water. The resulting solution contains about 0.76% pure pectin, which is approximately equal to the maximum concentration obtained by commercial extraction of citrus fruit material. This standard solution is quite pure, containing only very small amounts of impurities, which are principally metal compounds. The standard solution is further characterized by a pH value of 3.25 and a viscosity of 46 seconds when measured in a standard 20 c. c. pipette at 70° F.

As explained in greater detail hereinbelow, we have disclosed in our copending application that greatly improved results are obtained by coprecipitating pectin from aqueous solutions by means of aluminum chloride and calcium carbonate instead of with ammonia and aluminum sulfate or chloride. The amount of aluminum chloride and calcium carbonate required to effect complete precipitation of pectin from the above described pure pectin solution has been determined as follows: The viscosity of water at 70° F., when measured with a standard 20 c. c. pipette, is 29 seconds. A coprecipitation of aluminum and hydroxide from the above mentioned standard pectin solution effecting a viscosity of 29 seconds in the mother liquor may be considered as having effected a complete removal of the pectin.

As indicated in our copending application, best results are obtained by first adding to the pectin solution an amount of calcium carbonate sufficient to raise the pH value to from 6.00 to 6.80 and thereafter incorporating with the pectin solution an amount of aluminum chloride sufficient to lower the pH value to from 4.00 to 4.50. If the viscosity of the mother liquor is more than one second above that of water, we adjust the pH with calcium carbonate or with aluminum chloride to a higher or lower pH value falling somewhere between the range of 4.00 to 4.50, until the desired viscosity is effected in the mother liquor. To precipitate all the pectin from one gallon of the standard pure pectin solution we have found that a minimum of 2.8 grams calcium carbonate (effecting a pH of 6.20) and of 20 c. c. of a 25% (by weight) $AlCl_3.6H_2O$ solution (effecting a pH of 4.30) was required. Some pectin is precipitated if amounts of calcium carbonate and aluminum chloride falling below these minima are used, but precipitation is not complete, as indicated by the fact that the mother liquor has a viscosity in excess of 29 seconds. Satisfactory precipitation can be effected by the use of more than the minimal amounts of aluminum chloride and calcium carbonate. For instance, satisfactory precipitation can be obtained by incorporating with one gallon of pectin solution 6.4 grams calcium carbonate effecting a pH of 6.70 and 80 c. c. of the above specified aluminum chloride solution effecting a pH of 4.35. The precipitates obtained in the above described experiments were quite satisfactory for pressing.

The presence of hydrochloric acid in the standard pectin solution does not interfere with the coprecipitation of pectin so long as sufficient additional amounts of calcium carbonate are added to neutralize the hydrochloric acid. After the addition to three one gallon batches of standard pectin solution of, respectively, 1.92 grams, 3.84 and 9.60 grams of hydrochloric acid followed by the addition of, respectively, 5.4 grams, 8.0 grams and 15.6 grams of calcium carbonate effecting pH values, respectively, of 6.10, 6.50 and 6.50, the addition, in each case, of 20 c. c. of the above specified aluminum chloride solution suffices to effect pH values of 4.30 to 4.35 with complete precipitation of all the pectin in the form of firm curds suitable for filtration.

We have further disclosed in our copending application that the solubility of pectin precipitated as described hereinabove from the standard pectin solution differs radically from the solubility of pectin prepared by conventional coprecipitation with aluminum hydroxide. For instance, if the pressed-out pectin curd obtained in the above described experiments is treated with a sufficient amount of 30% hydrochloric acid to reduce the pH value below 2.00, the curd is redissolved to form a smooth completely homogeneous pectin solution. If this relatively heavy solution which approaches the consistency of a paste is treated with alcohol to precipitate the pectin and rinsed repeatedly with additional alcohol until the pH value is raised to 2.50 and then treated with ammonium carbonate or calcium carbonate to bring the pH value to 3.00, the pure pectin obtained after drying will be found to be absolutely insoluble in plain water. To be sure, this pectin, when exposed to water, will swell up to several times its size when dry, but the viscosity of the water remains practically unchanged. Similarly, if the pressed-out curd is treated with aqueous alcohol containing enough hydrochloric acid to reduce the pH value of the alcohol to 3.00 or less, for the purpose of washing out the aluminum hydroxide from the precipitated pectin, and if such washing is followed by repeated rinsings with alcohol and by neutralization with ammonium bicarbonate or calcium carbonate, the pectin obtained after drying is also insoluble in plain water. Washing of the curd with alcohol containing hydrochloric acid yields pectin that is dispersible in plain water to form a viscous liquid. As washing progressively removes aluminum hydroxide, the viscosity of the pectin solutions is gradually decreased until a value close to that of the viscosity of pure pectin solutions is reached. These solubility phenomena are due to the presence of aluminum hydroxide in the pectin and to the calcium and ammonium ions introduced by such neutralizing agents as may be used. These effects will be discussed in greater detail hereinbelow.

The above disclosed pectin that is insoluble in plain water can be dispersed in water by other means than the addition of dextrose or sugar. Small additions of alkali metal salts of organic acids such as sodium citrate, sodium acetate or Rochelle salts serve to disperse the otherwise insoluble pectin in water. For instance, an addition of, say, 10% of sodium citrate by weight to the dry pectin will cause the pectin immediately to dissolve in water to form an absolutely smooth and perfectly homogeneous solution. If dry alkali metal salts of organic acids are incorporated with the dry pectin, the pectin, when stirred with water will dissolve as easily as ordinary granulated sugar. We believe that the dispersing effect on otherwise insoluble pectin of organic acids, in particular, hydroxy substituted organic acids, and their salts is due to a solubilizing by the dispersing agents of small amounts of aluminum hydroxide present in the otherwise insoluble pectin. However, the present application relates not to the pectin disclosed in our copending application as insoluble in water but to pectin that is dispersible in plain water to form oily liquids that are more viscous than dispersions of pure pectin in plain water.

It is therefore an important object of the present invention to provide pectous material containing more than 1.5% $Al_2O_3$.

Another object of this invention is to provide aqueous dispersions of pectous material containing more than 1.5% $Al_2O_3$, in particular, by the use of alkali metal salts of organic acids as dispersing agents.

A further object of the invention is to provide methods for the preparation of the above mentioned pectous materials and dispersions.

Other and further objects and features of this invention will become apparent from the following description and appended claims.

As disclosed in our copending application the coprecipitation of pectin from aqueous solutions with aluminum hydroxide is profoundly affected by the presence or absence of organic acids and their salts in said aqueous pectin solution. The effect of hydroxy substituted organic acids and their salts is of particular interest, since such acids and salts are naturally present in many fruits and other vegetable material from which pectin is commercially extracted.

Our copending application shows that coprecipitation of pectin from aqueous solutions with aluminum hydroxide is affected by the presence or absence of alkali metal ions such as sodium ions in said aqueous pectin solution. More particularly, we have found that alkali metal ions peptize pectin, whereby complete precipitation is made difficult.

When, for instance, citric acid is added to a standard pectin solution described hereinabove, the coprecipitation of the pectin with aluminum hydroxide is effected profoundly. If to one gallon of pectin solution 3.8 grams of citric acid are added (0.1% citric acid), giving a pH value of 3.05, no precipitate is obtained by subsequently adding 5.6 grams calcium carbonate (2.8 grams sufficient in the absence of citric acid plus 3.8 grams required to neutralize the citric acid and to give a pH value of 5.90) followed by the addition of 20 c. c. of the specified aluminum chloride solution giving a pH value of 4.60. When 3.8 grams citric acid (0.1%) has been added to one gallon of pectin solution, we find it necessary to add 8 grams calcium carbonate effecting a pH value of 6.20 and 52 c. c. of the specified aluminum chloride solution effecting a pH value of 4.30 in order to precipitate the pectin completely in satisfactorily firm condition. In other words, in the presence of 0.1% citric acid, complete pectin precipitation requires more than two and a half times as much calcium carbonate and more than two and a half times as much aluminum chloride solution as in the absence of the citric acid. It may be necessary to adjust the final pH value within the range of 4.00 to 4.50, if the final viscosity of the mother liquor is not satisfactory. For instance, if precipitation from a pectin solution containing 0.1 per cent citric acid is attempted with 6.92 grams calcium carbonate effecting a pH of 6.30 and 43 c. c. of aluminum chloride solution effecting a pH of 4.25, the mother liquor will have a viscosity of 40 seconds, which indicates incomplete precipitation. The curds obtained are also too soft for immediate filtration.

The effect of the addition of 7.6 grams (0.2 per cent) of citric acid giving a pH of 2.90 is illustrated by the following experiments. No precipitation occurs on the addition of 8 grams calcium carbonate giving a pH value of 5.30 followed by the addition of 52 c. c. aluminum chloride solution giving a pH value of 3.32. No precipitation occurs on the addition of 11.20 grams calcium carbonate giving a pH value of 5.90 followed by the addition of 62 c. c. of aluminum chloride solution giving a pH of 4.25. A complete precipitation of the pectin in the form of firm curds is effected by the addition of 14.40 grams calcium carbonate giving a pH value of 6.30 followed by the addition of 100 c. c. of aluminum chloride solution giving a pH value of 4.30.

The presence of alkali metal salts of organic acids in the standard pectin solution has a similar effect. The addition of 4 grams of sodium citrate giving a pH value of 4.20 prevents any precipitation at all on the addition of 2.8 grams of calcium carbonate giving a pH value of 6.50 followed by an addition of 20 c. c. of the above specified aluminum chloride solution giving a pH value of 4.20. After the addition of 8 grams of sodium citrate effecting a pH value of 5.0, the addition of 5.4 grams of calcium carbonate effecting a pH value of 7.05 followed by an addition of 60 c. c. of the above specified aluminum chloride solution effecting a pH value of 4.25 effected only an incomplete precipitation of pectin in the form of soft curds.

The above described experiments illustrate certain features of the improved method for preparing pectin from pectous material disclosed and claimed our copending application filed of even date herewith. One feature of the invention of the copending application relates to precipitation of pectin from a pectous extract by means of calcium carbonate in conjunction with aluminum chloride, in order to avoid the adverse effects following the use of ammonia. Another feature of the invention of the copending application has to do with the removal of alkali metal ions and of organic acids, in particular, hydroxy substituted acids, and their salts from pectous material prior to extraction of pectin therefrom. Still another feature of the invention of the copending application involves the treatment of pectin isolated from a pectin extract by coprecipitation with aluminum hydroxide in the absence of substantial amounts of alkali metal ions and of organic acids and their salts followed by washing with acidic alcohol to remove coprecipitated aluminum hydroxide.

The process described in the copending application for extracting pectin from fruit material, such as citrus fruit or peels thereof, includes an initial washing with water for the purpose of removing organic acids, salts thereof and alkali metal ions. An ordinary washing of lemon or other citrus fruit peel with cold water does not remove citric acid completely, for an extract of the washed peel or other fruit material as a rule contains more than 0.2% of citric acid. A citric acid content in the extract of this magnitude is great enough to affect adversely the coprecipitation of pectin with aluminum hydroxide. We find it necessary to remove citric acid to an extent where the resulting extract will contain not more than 0.2% of citric acid or, preferably, not more than 0.1% of citric acid. The preferred low citric acid content can be effected by washing one part, by weight, of the peel or other fruit material with at least eight parts of cold water while simultaneously or previously grinding the peel to relatively small particle size. After such combined grinding and washing, an extraction will yield a pectin extract containing between 0.5 and 0.75% of pure pectin, depending upon the type of citrus fruit processed. The lower the grade of the pectin the higher will be the pectin content of the extract. Besides citric acid estimated at about 0.10% on the basis of a titration with sodium hydroxide to a pH of 7.00, the extract also contains calcium citrate and potassium citrate. We have not determined the exact percentages of these salts present but surmise that for each 11 parts by weight of citric acid there is present the equivalent of 1 part of sodium citrate. This estimate is based on the results obtained from the following experiment. A 6% citric acid solution has a pH of 1.90. Lemon juice containing the same amount of citric acid has a pH value of from 2.30 to 2.60. Calcium and/or potassium citrate present in the juice apparently buffer the juice to raise the pH value to 2.30 to 2.60. When 0.525 gram of sodium citrate are added to 100 c. c. of a 6% solution of citric acid, the pH is raised from 1.90 to 2.50. The ratio of citric acid to sodium citrate is about 11.2 to 1.

The importance of complete washing is illustrated by the following experiments. One gallon of a commercial pectin extract containing 3.8 grams of citric acid and 0.34 grams added sodium citrate requires 11 grams calcium carbonate and 100 c. c. of the above described aluminum chloride solution for complete precipitation of the pectin. One gallon of commercial pectin extract containing 7.6 grams of citric acid and 0.68 gram added sodium citrate requires for complete precipitation of pectin 20 grams calcium carbonate and 200 c. c. of the above specified aluminum chloride solution.

The methods for isolating pectin according to the methods of the copending application may be characterized as including an initial removal of alkali metal ions and of organic acids and their salts from the material to be extracted followed by an extraction, a coprecipitation of pectin with aluminum hydroxide, and a washing out of the coprecipitated aluminum hydroxide. The coprecipitation of pectin with aluminum hydroxide in the absence of those amounts of alkali metal ions and of organic acids and their salts normally present when pectin is conventionally coprecipitated with aluminum hydroxide reduces sharply the amount of aluminum hydroxide required for coprecipitation. The use of calcium carbonate together with aluminum chloride for generation of the aluminum hydroxide avoids the use of objectionably high pH values. Calcium chloride formed when the aluminum hydroxide is precipitated contributes to the formation of firm curds that are immediately suitable for filtration.

The precipitated and pressed-out curd obtained by the precipitation method of our copending application usually contains for each three pounds of pectin (dry basis) about twenty pounds water and other non-pectous matter including aluminum and iron hydroxides.

The coprecipitated pectin, before removal of aluminum hydroxide, and whether dry or wet, is insoluble in water and can be stirred in the water like sand without any lumping. The curd has a pH of about 4.00 to 4.50. It is necessary to remove the water and other non-pectous matter, while at the same time it is desirable to confer on the finished pectin a pH value of about 3.00. Treatment for this purpose suitably includes washing in an acidified alcoholic medium for the purpose of dissolving out from the curd aluminum and iron hydroxide leaving a maximum ash content of 1.5%) while not extracting the pectin content of the curd. Additional steps may include washing with alcohol and washing with an aqueous alcohol containing a preferably organic buffer salt in amount such as to restore to the pectin a pH value of 3.00. At this point the pectin is pressed free of alcohol, dried and ground. After standardizing the jelly strength of the pectin by the well known H. T. Leo method, the pectin is ready for the market.

The effect of washing the precipitated curd with with 45% alcohol containing various amounts of hydrochloric acid and hence having various pH values is illustrated by the following table:

| Experiment No. | pH of alcohol | Ash content of curd after washing | Sodium citrate required to disperse the pectin completely |
|---|---|---|---|
| | | Percent | Percent |
| 1 | 1.00 | 1.50 | None |
| 2 | 1.50 | 1.91 | 2 |
| 3 | 2.00 | 2.50 | 10 |
| 4 | 2.50 | 2.80 | 15 |
| 5 | 3.00 | 4.54 | 20 |
| 6 | (¹) | 12.35 | (²) |

¹ No acid used.
² More than 45.

The test for completion of dispersion is conformance to the pectin grade test to be expected from the pectin being used.

As to apparent solubility when exposed to water, we have noted that the pectin of experiment 6 swells in water but does not form any dispersion. The other pectins are more or less dispersible in water and form apparent solutions. When two grams of each of pectins Nos. 2 to 5 are mixed with 400 c. c. distilled water, the pectin appears to be dissolved after 24 hours. The viscosities of the resulting dispersions are tabulated as follows:

| No. | Viscosity |
|---|---|
| | Seconds |
| 2 | 60 |
| 3 | 70 |
| 4 | 130 |
| 5 | 170 |

On adding 2 c. c. of a 25% (by weight) sodium citrate solution, the viscosities were modified as follows:

| No. | Viscosity |
|---|---|
| | Seconds |
| 2 | 51 |
| 3 | 53 |
| 4 | 56 |
| 5 | 60 |

On adding 1 c. c. more of sodium citrate solution, the following viscosities were obtained:

| No. | Viscosity |
|---|---|
| 2 | 48½ |
| 3 | 52 |
| 4 | 53 |
| 5 | 53 |

When a total amount of 4 c. c. of the sodium citrate solution had been added, the pectin dispersions all had viscosities of from 48½ to 49½ seconds, and all the pectin was dissolved, as indicated by the grade values obtained by the Leo jelly test.

As pointed out hereinabove, aluminum hydroxide may be removed from pectin coprecipitated with aluminum hydroxide by washing with acidified alcohols. For jelly making, the aluminum hydroxide must be rather completely removed, since the utility of pectin containing coprecipitated aluminum hydroxide is limited for jelly making purposes by the pH necessary to dissolve the aluminum hydroxide. For instance, if the pH of solution of aluminum hydroxide is below the pH of set at 218° F. of the pectin (for explanation of the term "pH of set at 218° F." reference is made to United States Patent No. 2,173,260, issued September 19, 1939, to Herbert T. Leo, Clarence C. Taylor and John Lindsey), the pectin will form a jell in the kettle.

We have found that washing with acidified alcohol can be replaced partially or completely by the use of organic acids or salts thereof which function as dispersing agents for the aluminum hydroxide contained in the pectin. This fact may be illustrated as follows. A pectin insoluble in plain water because of a high aluminum hydroxide content is suspended in water as a 3% suspension (dry measure), and increments of a standard sodium citrate solution are added to the suspension. More and more pectin will go into solution until the viscosity becomes constant or nearly so, and the pectin solution flows freely from a pipette as an oily liquid. The amount of sodium citrate added may be as much as 100% of the weight of the calculated pure 250 grade pectin (dry measure) before solution is accomplished. If, on the other hand, the same insoluble pectin should be washed with alcohol acidified with hydrochloric acid to an extent where the pectin is practically freed from aluminum hydroxide, we will need as much as 75% of the weight of pure 250 grade pectin in HCl (dry measure). For instance, it takes approximately 0.20 gallon or 2.5 pounds of 30% hydrochloric acid to wash one pound of 250 grade pectin (dry basis) free from aluminum hydroxide to the point where no sodium citrate is needed to peptize this pectin and to dissolve the residual aluminum hydroxide. This amount of 30% hydrochloric acid corresponds to 0.75 pound of 100% HCl.

In other words, to solubilize one pound of insoluble pectin one pound of sodium citrate is required in the absence of any treatment with alcohol and hydrochloric acid, while 0.75 pound anhydrous HCl are required in the absence of any treatment with sodium citrate, while, of course, combined treatment with hydrochloric acid and with sodium citrate requires smaller amounts of these two agents.

A straight alcohol washing may be carried out with an acidified alcohol solution containing about 40% alcohol. For instance, 10 pounds of press cake may be washed with 2.167 gallons (15.8 pounds) of 74% alcohol mixed with 2 pounds 30% hydrochloric acid (0.6 pounds dry HCl). The pH of this acidified alcohol is about .075 to 0.80. The washing with acidified alcohol may be followed by, say, 5 successive rinses with 85% alcohol and a neutralization with an organic buffer salt effecting a pH of 3.00. The yield amounts to 0.65 to 0.8 pound of 250 grams pectin which is soluble in water but which lumps badly when wetted with water.

As disclosed hereinabove we can produce pectin having any desired degree of solubility ranging between the extremes described hereinabove by varying the pH value at which the alcohol washing is carried out. For instance, if we employ barely enough hydrochloric acid in the acidified alcohol to effect a pH of 3.00, only a small portion of aluminum hydroxide is washed out. The resulting pectin is insoluble in water, and may require as much as 75% of its weight in sodium citrate to disperse the pectin as a 3% solution. If enough hydrochloric acid is added to effect a pH of 2.00 in the rinsing alcohol, more aluminum hydroxide will be washed out, and the pectin will still be insoluble in water but may require only 50% by weight sodium citrate to disperse the pectin as a 3% solution. If an amount of HCl is added sufficient to effect a pH of 1.00 in the washing alcohol, and if the washing with alcohol is followed by an adjustment of the pH value of the pectin to 3.00, the pectin obtained is not completely soluble in water and requires 10% by weight of sodium citrate to disperse the pectin as a 3% solution.

It will be seen that the amount of aluminum hydroxide washed out of the pectin and consequently the solubility effected as well as the amount of citrate required to disperse the pectin can be controlled by adjusting the amount of hydrochloric acid and the pH value of the alcohol used in the washing step.

The present invention thus provides methods for dispersing in water pectin containing more than 1.5% $Al_2O_3$. If desired, the dispersing agent (alkali metal salts of organic acids or the free acids) can be incorporated with the dry pectin. The resulting pectous product is freely soluble in water.

The novel pectous products of this invention are useful for many purposes. For instance, the pectins of this invention form an excellent substitute for agar-agar. Agar, when boiled in water, dissolves, and upon cooling sets to a jelly. Our novel pectin products may be dissolved in water containing hydrochloric acid and then caused to jell by the addition of milk of magnesia. The resultant jelly may be used in place of agar-agar, for instance, in medicinal preparations intended to supply bulky material for the intestinal tract. Solutions of our pectin can also be used as a substitute for gum tragacanth. Gum tragacanth contains two constituents: one constituent is water soluble, the other absorbs water and swells. Together the two ingredients form a heavy paste. A similar heavy paste can be prepared from our pectin by the use of sodium citrate.

Our pectin can also be used as a substitute for quince gum or for alginates. Consistency and other properties can easily be controlled by varying the amount of sodium citrate or the like present.

Where a swelling property is useful, such as in the making of sherbets, ices, and ice creams, our novel pectin can be used as a stabilizer, the degree of swelling being controlled by adjusting the amount of sodium citrate or the like to a fraction of that required for complete solution.

It will thus be seen that we have provided a new type of pectin containing a sufficient amount of aluminum hydroxide to render the pectin incompletely dispersible in plain water but at the same time completely dispersible in water by means of alkali metal salts of organic acids. We have further provided a method for preparing such a pectin including the steps of coprecipitating the pectin with aluminum hydroxide from an aqueous solution thereof followed, if desired, by a washing with acidified aqueous alcohol in sufficient amounts to remove all the aluminum hydroxide.

Another feature of the present invention relates to the control of the solubility characteristics in plain water of pectin coprecipitated with aluminum hydroxide by treatment with organic acids or salts thereof.

Many details of procedure and composition may be varied within a wide range without departing from the principles of this invention, and it is therefore not our intention to limit the patent granted on this invention otherwise than necessitated by the scope of the appended claims.

We claim as our invention:

1. A dry pectin containing at least 1.5% $Al_2O_3$ and hence per se not completely dispersible in water and containing an amount of an alkali metal salt of a hydroxy substituted organic acid sufficient to render said pectin completely dispersible in water.

2. A dry pectin containing at least 1.5% $Al_2O_3$ and hence per se not completely dispersible in water and containing an amount of sodium citrate sufficient to render said pectin completely dispersible in water.

3. A method of dispersing in water a pectin containing at least 1.5% $Al_2O_3$ and hence per se not completely dispersible in water which comprises incorporating with said water an amount of an alkali metal salt of a hydroxy substituted organic acid sufficient to disperse said pectin and dispersing said pectin in the resulting aqueous salt solution.

4. A method of dispersing in water a pectin containing at least 1.5% $Al_2O_3$ and hence per se not completely dispersible in water which comprises incorporating with said water an amount of sodium citrate sufficient to disperse said pectin and dispersing said pectin in the resulting aqueous citrate solution.

5. A dispersion of a pectin containing at least 1.5% $Al_2O_3$ in an aqueous solution of an alkali metal salt of a hydroxy substituted organic acid.

6. A dispersion of a pectin containing at least 1.5% $Al_2O_3$ in an aqueous solution of sodium citrate.

HERBERT T. LEO.
CLARENCE C. TAYLOR.